3,459,783
METHOD OF PREPARING MALONONITRILE
Edward George Budnick, Scotch Plains, N.J., assignor to Plains Chemical Development Co., Garwood, N.J., a corporation of New Jersey
No Drawing. Filed Oct. 31, 1966, Ser. No. 590,461
Int. Cl. C07c 121/12, 121/22
U.S. Cl. 260—465.2          9 Claims

ABSTRACT OF THE DISCLOSURE

Malononitrile is prepared by reacting cyanoacetamide with phosphorus oxychloride in the presence of an alkaline earth metal salt. Preferred salts are calcium carbonate and calcium chloride. If an excess of phosphorus oxychloride is employed no solvent is required. Otherwise conventional solvents, e.g., ethylene dichloride, are employed.

---

The present invention relates to the preparation of molononitrile from cyanoacetamide.

It has previously been proposed to prepare malononitrile from cyanoacetamide and phosphorus oxychloride. One method involves the use of large amounts of sodium chloride (Surrey Patent 2,389,217). This method has the disadvantage of requiring large amounts of sodium chloride and solvent. The process takes 8 hours and only low yields of malononitrile are obtained. Furthermore, there are encountered problems due to the absorption of the byproducts and solvent to form a gummy product.

It has also been proposed to add an alkali metal sulfite or bisufite in reacting cyanoacetamide with phosphorus oxychloride (Maxion Patent 2,799,697). This process has the disadvantage of requiring 252 parts or more of sodium bisulfite to yield only 190 parts of malononitrile. Furthermore, the yield of desired product is only about 9% of the total weight charged. Such a low overall yield is uneconomical on a plant scale. Additionally, resin formation occurs in the reaction. This resin coats the walls of the reaction vessel and finally jams the agitator and causes agglomeration of the solid adsorbent which forms a tacky mass which cannot be broken up or stirred by normal means. Its presence creates a problem in carrying out the process. The yield is also undesirably low.

The use of Attaclay has been suggested in Kesslin Patent 2,802,857. However, such a process gives low yields, e.g., not over 58.1%, requires long reaction times and large amounts of adsorbent.

It is an object of the present invention to prepare malononitrile in increased yields.

Another object is to reduce the amounts of extraneous matter employed in the formation of malononitrile.

An additional object is to reduce the amount of resinous byproduct formed during the preparation of malononitrile.

A further object is to eliminate the necessity for the use of solvent in the formation of malononitrile from cyanoacetamide.

Yet another object is to provide a method for the production of malononitrile that can be carried out in normal plant equipment and with the formation of the product as a granular mass composed of discrete particles which can be conveniently filtered.

Still other objects and the entire scope of applicabilty of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention malononitrile is prepared by heating a mixture of cyanoacetamide, an amount of alkaline earth metal salts adequate to insure the formation of a granular precipitate and phosphorus oxychloride. The reaction is carried out in a solvent inert to the reactants unless an excess of phosphorus oxychloride is employed. In the event that at least 2 moles of phosphorus oxide are employed for each mole of cyanoacetamide the solvent can be omitted and good yields can still be obtained.

When a solvent is employed there can be used as little as 0.1 mole of phosphorus oxychloride per mole of cyanoacetamide although preferably at least 0.4 mole of the phosphorus oxychloride is employed. Generally there is no advantage in empolying more than 1.0 mole of phosphorus oxychloride per mole of cyanoacetamide unless the solvent is omitted. When the solvent is omitted preferably 3 to 4 moles of phosphorus oxychloride are employed per mole of cyanoacetamide. However, the amount of phosphorus oxychloride can be as much as 10 moles per mole of cyanoacetamide although this is somewhat wasteful.

The alkaline earth metal salt is employed in an amount of 2 to 100 grams per mole of cyanoacetamide. Preferably, 10 to 30 grams of the alkaline earth metal salt are used per mole of cyanoacetamide.

As the alkaline earth metal salt there can be used, for example, calcium carbonate, calcium chloride, calcium bromide, magnesium carbonate, calcium magnesium carbonate (dolomite), magnesium chloride, gypsum ($CaSO_4 \cdot 2H_2O$), plaster of Paris ($CaSO_4 \cdot \frac{1}{2}H_2O$), barium chloride, barium carbonate, strontium chloride and strontium carbonate.

When a solvent is employed it is normally used in an amount of 1 to 2.5 times the weight of the cyanoacetamide. Preferably, the solvent is twice the weight of the cyanoacetamide.

Any of the conventional inert solvents can be used, such as liquid hydrocarbons and liquid halogenated hydrocarbons such as ethylene dichloride, acetylene dichloride, benzene, toluene, ethylene trichloride, carbon tetrachloride, monochlorobenzene, petroleum ether, and xylene. High boiling solvents such as chlorinated paraffin (Chlorowax), chlorinated terphenyl (drochlor), mineral oil, esters such as dioctyl phthalate and tricresyl phosphate can be used to enable one to efficiently distill the malononitrile from the vessel without danger of decomposing the last traces by overheating the residue.

The reaction is carried out with the aid of heat, usually at the reflux temperature of the phosphorus oxychloride or the solvent.

Unless otherwise stated all parts and percentages are by weight.

Example 1

A mixture of 42.0 grams (0.5 mole) of cyanoacetamide, 61.3 grams (0.4 mole) of phosphorus oxychloride, 87.5 grams of ethylene dichloride and 9.2 grams of calcium carbonate was prepared. The mixture was stirred and heated. At a temperature of 83° C. rapid evolution of hydrogen chloride began. The mixture was stirred and refluxed for 3 hours. At the end of this time, hydrogen chloride evolution had ceased. The mixture was cooled and the granular mass of discrete particles easily filtered and the filtrate distilled in vacuo to give 26.4 grams (80% yield) of essentially pure malononitrile, set point 31.7° C. The malononitrile distilled at a vapor temperature of 110° C. at 20 mm. pressure.

Example 2

The procedure of Example 1 was repeated except that the calcium carbonate was replaced by 9.2 grams of calcium chloride. The yield of pure malononitrile was 27.7 grams (84%).

Example 3

A mixture of 42.0 grams of cyanoacetamide, 61.3 grams of phosphorus oxychloride, 87.5 grams of ethylene dichloride, 4.2 grams of calcium chloride and 5.0 grams of calcium carbonate was prepared. The mixture was stirred and refluxed for 2.5 hours after which time hydrogen chloride evolution had stopped. The reaction mixture was easily filtered and the filtrate was distilled to yield 26.5 grams (80% yield) of malononitrile.

Example 4

The procedure of Example 1 was employed except that the amount of phosphorus oxychloride was reduced to 46.0 grams (0.3 mole). The yield of malononitrile was 22.1 grams (70.0%).

Example 5

The procedure of Example 1 was repeated except that the amount of phosphorus oxychloride was increased to 76.7 grams (0.5 mole). The yield of malononitrile was 26.4 grams (84%).

Example 6

The procedure of Example 1 was used except the calcium carbonate was replaced by 9.2 grams of magnesium carbonate. The yield of malononitrile was 19.8 grams (60.0%).

Example 7

A mixture of 42.0 grams (0.5 mole) of cyanoacetamide, 306.7 grams (2.0 moles) of phosphorus oxychloride, and 9.2 grams of calcium carbonate was heated to reflux. After 3 hours, hydrogen chloride evolution had ceased. The precipitate was filtered and the filtrate distilled in vacuo to yield 21.5 grams (65% yield) of mononitrile.

Example 8

The procedure of Example 7 was repeated except that the calcium carbonate was replaced by 9.2 grams of calcium chloride. The yield of malononitrile was 25.0 grams (76.0%).

Example 9

A mixture of 42.0 grams (0.5 mole) of cyanoacetamide, 65.0 grams (0.425 mole) of phosphorus oxychloride, 9.2 grams of anhydrous barium carbonate and 87.3 grams of ethylene chloride was stirred and heated to reflux (87° C.). At 45° C. a rapid evolution of HCl took place. Evolution slowed considerably as the temperature reached 75° C. Within an hour solid chunks formed making stirring difficult. Thirty minutes later the chunks broke up into discrete sticky yellow particles which eventually coated the walls of the reaction flask. At the end of 3 hours and 45 minutes the reaction was complete. Thirty grams of HCl (87% of theory) had evolved. The mixture was cooled to room temperature with stirring and was filtered. A coarse irregular sized precipitate was left on the filter. This was washed with a small amount of ethylene dichloride. The filtrate was distilled under water pump vacuum and heated to a pot temperature of 150° C. There were obtained 22.8 grams of malononitrile (67% yield).

The barium salts, while operative in the present invention, do not give as good overall results as the corresponding calcium salts.

Example 10

A mixture of 42.0 grams of cyanoacetamide, 65.0 grams of phosphorus oxychloride, 9.2 grams of anhydrous barium chloride and 87.5 grams of ethylene dichloride were stirred and heated to reflux (87° C.). At 55° C. rapid evolution of HCl took place. Evolution slowed considerably as the temperature reached 80° C. Within an hour a single solid chunk formed making stirring difficult. Twenty-five minutes later the chunk broke up into discrete sticky particles which eventually coated the walls of the flask. At the end of 3 hours and 30 minutes the reaction was complete. Thirty-one grams (85% of theory) of HCl had evolved. The mixture was cooled to room temperature with stirring and was filtered. A coarse, irregular sized precipitate was left on the filter. This was washed with a small amount of ethylene dichloride. The filtrate was distilled under water pump vacuum and heated to a pot temperature of 150° C. There were obtained 21.6 grams (65.5% of theory) of malononitrile.

Example 11

A mixture of 42.0 grams of cyanoacetamide, 65.0 grams of phosphorus oxychloride, 9.2 grams of strontium carbonate and 87.5 grams ethylene chloride was stirred and heated to reflux (87° C.). At 77° C. rapid evolution of HCl took place. Within 11 minutes the temperature dropped to 70° C. whereupon a lump formed. Within 4 minutes the lump broke up into yellow colored coarse, discrete particles. At the end of 3 hours and 30 minutes reaction was complete. Thirty-one grams of HCl had evolved (85% theory). The mixture was cooled to room temperature with stirring and was filtered. A coarse, yellow green evenly sized precipitate was left on the filter. This was washed with a small amount of ethylene dichloride. The filtrate was distilled under water pump vacuum and heated to a pot temperature of 150° C. Malononitrile was recovered in an amount of 26.7 grams (80.8% of theory).

What is claimed is:

1. In the process of preparing malononitrile by heating up to reflux a mixture of 1 mole of cyanoacetamide and 0.1 to 10 moles of phosphorous oxychloride the improvement conssisting essentially of including in the mixture an alkaline earth metal salt which is a carbonate, chloride, bromide or sulfate in an amount of 2 to 100 grams of salt per mole of cyanoacetamide.

2. A process according to claim 1 wherein the salt is a calcium salt.

3. A process according to claim 2 wherein the calcium salt comprises calcium carbonate.

4. A process according to claim 2 wherein the calcium salt comprises calcium chloride.

5. A process according to claim 1 which is carried out in the presence of an inert solvent.

6. A process according to claim 1 which is carried out in the absence of a solvent and the phosphorus oxychloride is used in an amount in excess of the cyanoacetamide on a molar basis.

7. A process according to claim 6 wherein 2 to 4 moles of phosphorus oxychloride are employed per mole of cyanoacetamide and the salt is a calcium salt.

8. A process according to claim 1 wherein the salt is a calcium salt and is employed in an amount of 10 to 30 grams per mole of cyanoacetamide.

9. A process according to claim 8 wherein the calcium salt is selected from the group consisting of calcium carbonate, calcium chloride and mixtures thereof.

References Cited

UNITED STATES PATENTS

| | | | |
|---|---|---|---|
| 2,389,217 | 11/1945 | Surrey | 260—465.2 |
| 2,459,128 | 1/1949 | Fahrenbach | 260—465.2 XR |
| 2,799,697 | 7/1957 | Maxion | 260—465.8 XR |
| 2,802,857 | 8/1957 | Kesslin et al. | 260—465.8 XR |
| 3,317,585 | 5/1967 | Herschmann | 260—465.2 |

JOSEPH P. BRUST, Primary Examiner